United States Patent
Hoffmann et al.

(10) Patent No.: US 6,708,898 B1
(45) Date of Patent: Mar. 23, 2004

(54) FLUIDIC NOZZLE

(75) Inventors: Bernd Hoffmann, Bad Hersfeld (DE); Jürgen Hofmann, Melsungen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/648,178

(22) Filed: Aug. 25, 2000

(30) Foreign Application Priority Data

Sep. 10, 1999 (DE) .......................................... 199 43 262

(51) Int. Cl.⁷ ................................................. B05B 1/10
(52) U.S. Cl. ................................ 239/284.2; 239/589.1; 239/590.5; 239/600; 239/DIG. 3; 285/921
(58) Field of Search ........................ 239/284.2, 589.1, 239/DIG. 3, 590.5, 600, 589; 137/836, 839, 835; 285/319, 921

(56) References Cited

U.S. PATENT DOCUMENTS

| 3,580,431 A | | 5/1971 | Kuffer et al. |
| 3,741,481 A | * | 6/1973 | Bauer ....................... 239/589.1 |
| 3,820,716 A | * | 6/1974 | Bauer ......................... 239/102 |
| 4,036,439 A | | 7/1977 | Green |
| 4,185,777 A | * | 1/1980 | Bauer .......................... 239/600 |
| 4,515,315 A | | 5/1985 | Corsette |
| 4,645,126 A | | 2/1987 | Bray, Jr. |
| 4,694,992 A | * | 9/1987 | Stouffer .................... 239/284.2 |
| 5,213,269 A | * | 5/1993 | Srinath et al. ........... 239/589.1 |
| 5,636,794 A | | 6/1997 | Hess et al. |
| 5,820,034 A | | 10/1998 | Hess |
| 5,845,845 A | | 12/1998 | Merke et al. |
| 5,873,385 A | * | 2/1999 | Bloom et al. .......... 137/543.19 |
| 6,176,442 B1 | * | 1/2001 | Eicher et al. ................ 239/591 |

FOREIGN PATENT DOCUMENTS

| CA | 935762 | * 10/1973 | .............. 239/589.1 |
| DE | 1059363 | 2/1955 | |
| DE | 2425518 | 2/1975 | |

* cited by examiner

Primary Examiner—Dinh Q. Nguyen
(74) Attorney, Agent, or Firm—Martin A. Farber

(57) ABSTRACT

In the case of a fluidic nozzle (12) a nozzle body (13) is fixed in a housing (17) by a form-locking latching connection (18). For this purpose, an elastically deformable latching body (14) engages in a recess (16) of the housing (17). The operational position of the nozzle body (13) is thereby defined with high accuracy, with the result that an undesirable escape of the liquid between the nozzle body (13) and the housing (17) is prevented. Furthermore, at the same time the contact surface can be reduced here to a section (20) which is inclined toward an outlet opening (19) of the fluidic nozzle (12) and has a correspondingly improved sealing.

6 Claims, 1 Drawing Sheet

FLUIDIC NOZZLE

FIELD AND BACKGROUND OF THE INVENTION

The invention relates to a fluidic nozzle having a nozzle body fixed in a housing, the housing having an inlet opening for a liquid.

A fluidic nozzle of this type is used, for example, in the case of headlamp cleaning systems of a motor vehicle, and is therefore known. In this case, the fluidic nozzle makes it possible for a strongly concentrated jet of liquid to be pivoted automatically over a comparatively large surface. Further mechanical aids for deflecting the jet of liquid are therefore not required.

The fluidic nozzle consists of the housing into which the essentially flat nozzle body is introduced, in particular from a front side. In order to effectively prevent the nozzle body from falling out, even at a relatively high liquid pressure, studs which are essentially linticular are mounted on an inner surface of the housing and are used to wedge the nozzle body in the housing when it is inserted therein. For this purpose, the studs bear against a depression on the nozzle body so as to keep the gap size between the nozzle body and the housing as small as possible. In the case of this prior art it has proven disadvantageous that the clamping connection at the same time also leads to the fluidic nozzle not being leaktight, because of the depression required for this on the nozzle body, and the liquid can escape in an uncontrolled manner through the gap required here. This leads to the visual appearance of the fluidic nozzle, which is generally mounted in a visible region of the motor vehicle, being impaired, in particular because of drop formation on an element of the bodywork adjacent to the fluidic nozzle.

Embodiments of a fluidic nozzle of this type are already known where the intention is to avoid the problem of leakage by inserting the nozzle body into the housing from a rear side. By this means, the nozzle body is pressed against a front edge region of an outlet opening by the pressure of the liquid and thus leads to an improved sealing. A disadvantage here is that for this purpose the housing is designed such that it can be divided in the region of the inlet opening, which leads to an increased outlay on production. Embodiments of this type are therefore only to be encountered in individual cases in practice.

SUMMARY OF THE INVENTION

The invention is based on the problem of providing a fluidic nozzle of the type mentioned at the beginning in such a manner that an uncontrolled escape of liquid from the fluidic nozzle is largely eliminated.

According to the invention, this problem is solved by the nozzle body being fixed in the housing by means of a form-locking (locking by complementary form of the respective parts) latching connection. This latching connection makes it possible here for the nozzle body to have a defined bearing surface on the housing, with the result that the gap size can be reduced and an undesirable escape of the liquid is thereby eliminated. In this case, the latching connection can, for example, also be realized without a depression, so that an essentially flat outer surface of the nozzle body is obtained.

In this case, a particularly advantageous development of the invention is given by the latching connection being arranged on a fixing surface facing away from a sealing surface of the nozzle body. This makes it possible for a sealing surface, which is determined by the bearing surface of the nozzle body against the inlet opening, to be separated from the fixing surface. The sealing surface can therefore have a surface finish which is adapted for providing a reliable sealing, with the result that the sealing can be further improved in a simple manner. At the same time, the fixing of the nozzle body is simplified in this case. To this end, said fixing may, for example, also take place in the region of an outlet opening of the fluidic nozzle so that the nozzle body can be removed from the housing for servicing purposes.

A refinement of the invention is also particularly favorable in which the fixing surface is arranged on a side of the nozzle body which lies opposite the inlet opening. By this means, at the same time as being fixed in the housing the nozzle body bears reliably against an edge region adjacent to the inlet opening. The sealing can be further simplified as a result.

A particularly advantageous refinement of the invention is provided if the latching connection is formed by a recess and a projection engaging in the latter. This substantially simplifies the installation process by the nozzle body being introduced into the housing and being latched at the predetermined position. In this case, the projection engages in the recess in such a manner that the nozzle body is unable to move relative to the housing.

A development is also particularly expedient for this in which the recess is arranged on the nozzle body and the projection is arranged on the housing. The projection can thereby be adapted individually for a respective application, in particular for a different liquid pressure, and the sealing action can thereby be substantially improved without changes having to be made for this to the housing. In this case, the projection can be connected integrally with the nozzle body or else as a separate component having a suitable material finish.

A particularly simple refinement of the invention is also provided by the nozzle body having at least one elastically deformable latching body which engages in a recess of the housing. By this means, the nozzle body, in order to fix it, is merely introduced into the housing until the latching body automatically latches against the projection. As a result, the nozzle body can be of comparatively small design, so that the sealing surface between the nozzle body and the housing can be reduced and the sealing thereby simplified. At the same time, the outlay on material required in order to produce the fluidic nozzle can be restricted.

A particularly simple development is provided here if the nozzle body only bears against the housing at a section of the housing facing an outlet opening of the fluidic nozzle. By this means, a sealing surface provided by the contact surface between the nozzle body and the housing has substantially reduced dimensions. As a result, the sealing can be substantially facilitated and at the same time the reliability at a high liquid pressure can also be increased.

Another particularly favorable refinement of the invention is provided by the nozzle body being prestressed with respect to the plane of the inlet opening by means of the latching connection. By this means, a sealing surface enclosed by the nozzle body and the housing can be subjected to a certain contact pressure load and the sealing can thus be improved. Possible deviations of the finish of the nozzle body and of the housing from a predetermined desired value are compensated for in the process and the operational reliability is therefore increased.

The latching connection can be accessible from a front side of the fluidic nozzle so as thereby to be able to remove the nozzle body for repair purposes. In contrast, another advantageous development is achieved if the latching connection is made for the unreleasable fixing of the nozzle body in the housing. This enables the nozzle body to be inserted into the housing in a gap-free manner, as a result of which the functional capability can be further increased. In this case, the latching connection can also be connected exchangeably to the nozzle body in such a manner that a forcible separation of the nozzle body from the housing merely results in destruction of the latching connection, which is available for this purpose as a replaceable component.

BRIEF DESCRIPTION OF THE DRAWINGS

The invention permits various embodiments. To further clarify its basic principle two of these are illustrated in the figures of the drawings and are described below. In the drawing, in each case in a partially cutaway side view.

DETAILED DESCRIPTION OF THE PREFERRED EMBODIMENT

Figure 1:
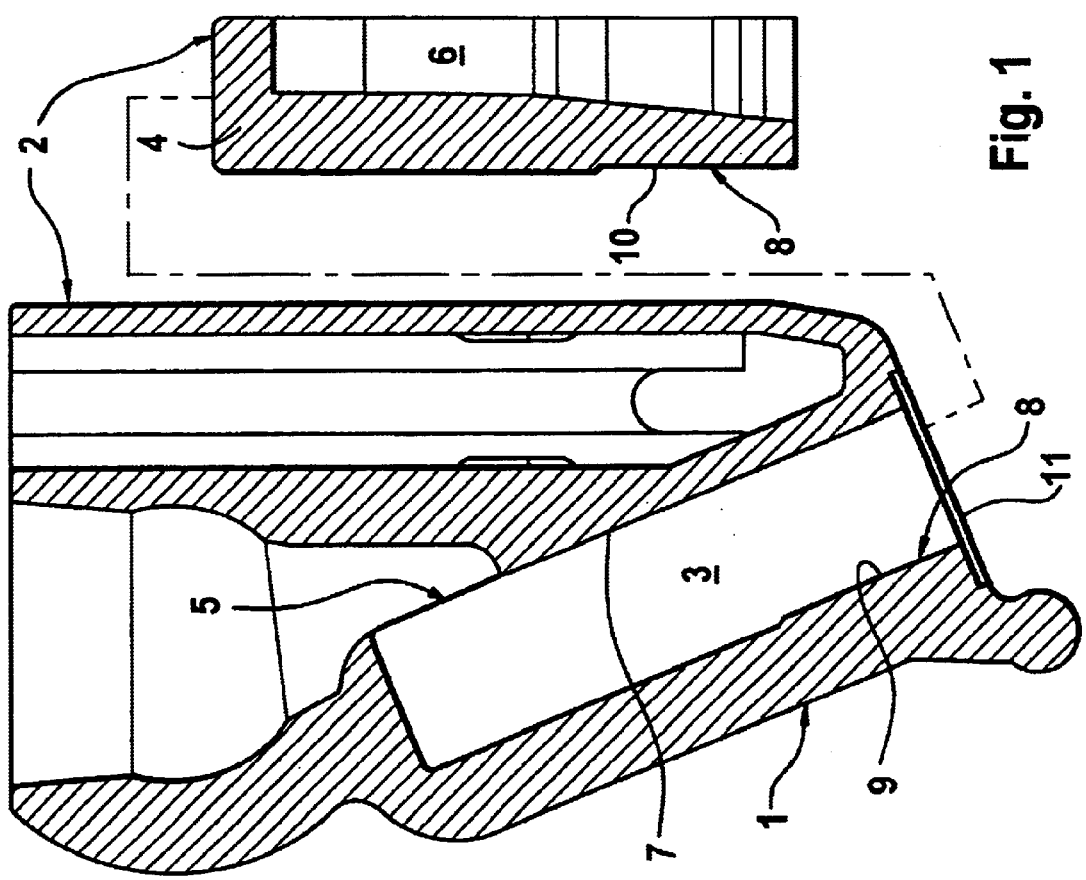
FIG. 1 shows in exploded view a housing and a nozzle body to be inserted in it of a fluidic nozzle according to the invention.

FIG. 1 shows in a side view a cutaway illustration of a housing 1 of a fluidic nozzle 2, and a nozzle body 4 to be inserted into a shaft 3 in the housing 1. An inlet opening 5 for the supply of a liquid (not illustrated) can be seen. In the operational position (not illustrated) of the nozzle body 4 the liquid passes through this inlet opening 5 into an internal space 6 in the nozzle body 4. For this purpose, in the operational position (not illustrated) the nozzle body 4 bears against an edge region 7 adjacent to the inlet opening 5. In order to fix the nozzle body 4 in the operational position use is made of a latching connection 8 which is formed by a projection 9, arranged on the housing 1, and a recess 10, connected to the nozzle body 4. The nozzle body 4 has limited elastic deformability for this purpose, so that the nozzle body 4 can be introduced from a front side 11 into the shaft 3 and latched there at its predetermined position.

Figure 2:
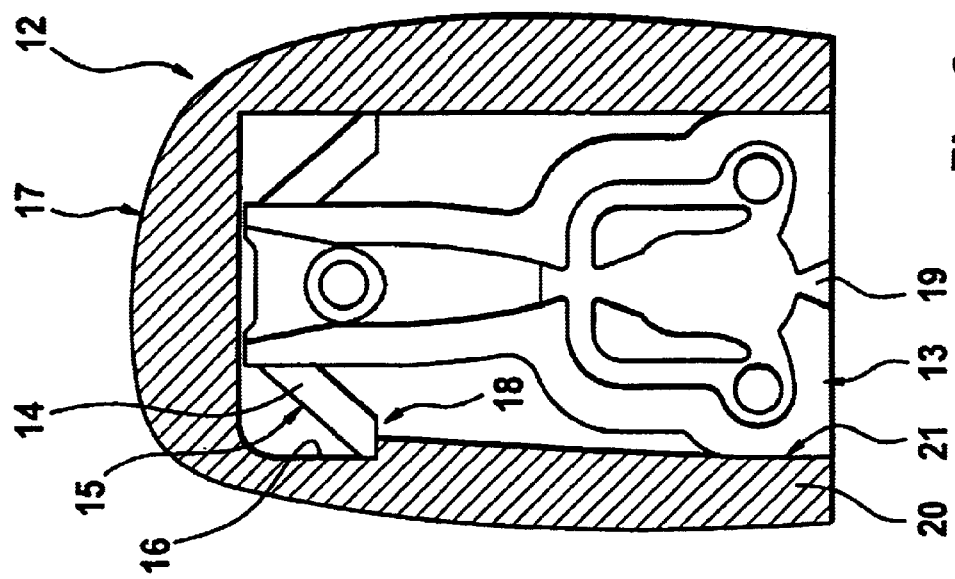
FIG. 2 shows another embodiment of a fluidic nozzle according to the invention.

An embodiment which is modified with respect thereto of a fluidic nozzle 12 according to the invention is shown in FIG. 2. In this case, a nozzle body 13 of the fluidic nozzle 12 is fitted with a projection 15 formed as an elastically deformable latching body 14. In the operational position shown, this latching body 14 engages in a recess 16 of a housing 17 of the fluidic nozzle 12, said latching body and recess therefore jointly forming a latching connection 18. In this case, the nozzle body 13 exclusively bears against the housing 17 at a section 20 thereof facing an outlet opening 19. The sealing surface 21 which is reduced by this means and is determined by the contact surface between the nozzle body 13 and the housing 17 makes a simple sealing possible, even at high liquid pressures. At the same time, the sealing plane described by the sealing surface 21 is independent of the fixing plane described by a latching surface of the latching connection 18, so that a defined operational position of the nozzle body 13 with a reliable fixing, on the one hand, and an effective sealing, on the other hand, are achieved.

It is noted that, in the securing of the nozzle body 4 within the shaft 3 (FIG. 1) by form-locking, there may be some distension of the housing 1 during the insertion of the nozzle body 4 in the shaft 3 to accommodate the projection 9 as the nozzle body 4 passes along the projection 9. However, upon completion of the insertion, the projection 9 fits within the recess 10 so that there is no longer any deformation of the housing nor of the nozzle body 4 because of the complementary undeformed forms of the nozzle body and the housing (form-fitting, i.e., form-locking). At this completion of the securing of the nozzle body 4 to the housing by form-locking, it is understood that the nozzle body 4 and the housing 1 retain their original shapes, without deformation such as is associated with a compression or a stretching during the process of inserting the nozzle body 4 into the shaft 3 of the housing 1.

We claim:

1. A fluidic nozzle comprising:

a housing (1, 17) having an inlet opening for liquid, and a pocket (3);

a nozzle body (4, 13) to be introduced from a front side (11) of the fluidic nozzle into said pocket (3); and a form-locking latching connection (8, 18) fixing said nozzle body in said housing, without deformation of said nozzle body and said housing, in an operational position, wherein the form-locking is attained by complementary forms of the nozzle body and the housing;

wherein said latching connection (8, 18) is arranged on a fixing surface, and said fixing surface is arranged on a side of the nozzle body (4) which lies opposite an inlet opening (5).

2. The fluidic nozzle comprising:

a housing (1, 17) having an inlet opening for liquid, and a Docket (3);

a nozzle body (4, 13) to be introduced from a front side (11) of the fluidic nozzle into said pocket (3); and a form-locking latching connection (8, 18) fixing said nozzle body in said housing, without deformation of said nozzle body and said housing, in an operational position, wherein the form-locking is attained by complementary forms of the nozzle body and the housing;

wherein the latching connection (8, 18) is formed by a recess (10, 16) and a projection (9, 15) engaging in the recess, and the recess (10, 16) is arranged on the nozzle body (4, 13) and the projection (9, 15) is arranged on the housing (1, 17).

3. A fluidic nozzle comprising:

a housing (1, 17) having an inlet opening for liquid, and a pocket (3);

a nozzle body (4, 13) to be introduced from a front side (11) of the fluidic nozzle into said pocket (3);

a form-locking latching connection (8, 18) fixing said nozzle body in said housing, without deformation of said nozzle body and said housing, in an operational position, wherein the form-locking is attained by complementary forms of the nozzle body and the housing; and wherein the form-locking latching connection is accomplished by contact of a projection with a recess along an interface between an inner surface of the pocket and an outer surface of the nozzle body, the projection being formed on one of said inner and said outer surfaces, and the recess being formed on the other of said inner and said outer surfaces.

4. The fluidic nozzle as claimed in claim 3, wherein the latching connection (8, 18) is formed by said recess (10, 16) and said projection (9, 15) engaging in the recess.

5. The fluidic nozzle as claimed in claim 3, wherein the nozzle body (4, 13) is prestressed with respect to a plane of the inlet opening (5) by means of the latching connection (8, 18).

6. The fluidic nozzle as claimed in claim 3, wherein the latching connection (8, 18) constitutes means for unreleasably fixing the nozzle body (4, 13) in the housing (1, 17).

* * * * *